United States Patent [19]

Antonuk

[11] Patent Number: 5,019,711

[45] Date of Patent: May 28, 1991

[54] SCANNING-LIQUID IONIZATION CHAMBER IMAGER/DOSIMETER FOR MEGAVOLTAGE PHOTONS

[75] Inventor: Larry E. Antonuk, Ann Arbor, Mich.

[73] Assignee: The Regents of the University of Michigan, Ann Arbor, Mich.

[21] Appl. No.: 326,688

[22] Filed: Mar. 21, 1989

[51] Int. Cl.[5] .......... G01T 1/185

[52] U.S. Cl. .......... 250/385.1; 250/374

[58] Field of Search .......... 250/374, 385.1

[56] References Cited

U.S. PATENT DOCUMENTS 4,810,893 3/1989 Meertens .......... 250/385.1

*Primary Examiner*—Carolyn E. Fields

*Attorney, Agent, or Firm*—Oblon, Spivak, McClelland, Maier & Neustadt

[57] ABSTRACT

A scanning, liquid ionization chamber IMAGER/-DOSIMETER having a rectangular housing with a top of a thin predetermined thickness. An internal frame lies inside the rectangular housing and is welded thereto. Two planes of orthogonal wires are strung across the internal frame and immobilized thereby. These wires are electrically insulated from the rectangular housing and internal frame by non-conductive connectors. A first plane of wires serves a sensing function while the other plane of wires has a bias applied thereto one wire at a time. The rectangular housing is sealed after a liquid ionization medium completely fills any open space contained inside the rectangular housing. Non-conductive feed through wiring means are connected to the planes of wires. The first and second planes of wires are suspended in free space inside the rectangular housing. The liquid ionization medium is of a purity so as to extend electron lifetime; thus when a radiation beam causes electrons in the ionization medium these free electrons are swept away by the electric field of the applied bias and are output as a detected signal.

11 Claims, 6 Drawing Sheets

SCANNING-LIQUID IONIZATION CHAMBER IMAGER/DOSIMETER FOR MEGAVOLTAGE PHOTONS

BACKGROUND OF THE INVENTION

1. Field of the Invention

The present invention pertains to the medical imaging field and more particularly to a scanning-liquid ionization chamber (SLIC) IMAGER/DOSIMETER for megavoltage photons.

2. Background of the Invention

The process by which a patient is exposed to a small amount of radiation after being positioned on a treatment couch but before the main treatment for purposes of assuring the correct positioning of the patient is known as localization imaging. During the course of the radiation treatment, it is desirable to be able to verify that the patient has not moved and is still in the desired position—this is known as verification imaging. The present invention can be used for both types of imaging.

At the present time, virtually all localization and verification imaging is performed using film. This results in several minutes of time being expended to produce a single image due to the inherently time-consuming development process. Further, film offers no real-time imaging capability so that only composite verification images integrated over the treatment can be produced. Imagers based on storage phosphor technology have become commercially available; however, the storage-phosphor imagers do not function in real time.

For a patient undergoing radiation therapy, time delays between irradiation and image formation can be wrought with a number of undesirable consequences. In the case of localization imaging, time delays result in patient discomfort. More importantly, time delays can result in set-up error caused by patient movement. The undesired exposure of healthy tissue to radiation is one consequence of set-up error. Another consequence is the difficulty of ascertaining the exact quantity of radiation which a target area has received.

Several prototype real-time imagers are being developed around the world, but most have no practical applications to clinical use. The most promising real-time clinical image detector in the literature to date is that developed by H. Meertens at the Netherlands Cancer Institute in Amsterdam and disclosed in European Patent Application 0196138. Related articles concerning Meertens' imaging device are M. Von Herk and H. Meertens, Radiotherapy and Oncology, 11 1988, pp 369–378, and H. Meertens et al, Phys. Med. Biol., 1985, Vol. 30, No. 41 pp 313–321.

The Meertens' device operates on the principle of a scanning liquid ionization chamber. The chamber is filled with a liquid dielectric, e.g. trimethylpentane pure to approximately 50 ppm, which acts as the ionization medium.

A problem with the Meertens' device is that it detects only positive and negative ions formed by the ionization radiation and not electrons. The reason for this inability to detect electrons lies in the fact that the ionization medium used by Meertens has a contamination level which results in the electrons being trapped by impurities in nanoseconds.

For electron detection an ionization medium having only a few molecules of impurities per billion molecules of ionization medium is desired. In this patent, impurities are understood as being electronegative impurities. However, the circuit-board design of the Meertens' device prevents such a level of purity from ever being attained. Contaminants inherent to the Meertens' circuit board pollute any liquid ionization medium to an unacceptable degree immediately upon the liquid's introduction to the device. This is to say that a very small portion of the materials constituting the Meertens' circuit board are dissolved in the liquid ionization medium. However, even this small portion of contamination makes electron detection impossible. Furthermore, the Meertens' ionization medium is subject to contamination by air leaking through the detector walls which are too porous for maintaining the necessary degree of purity.

Advances in detector technology at CERN in Geneva, Switzerland have resulted in radiation detectors which use parts per billion clean 2,2,4,4-tetramethylpentane (TMP) as an ionization medium. TMP is now realized to be a superior ionization medium, see Nuclear Instruments and Methods in Physics Research A265 pp 303–318. The CERN detectors have been designed for experiments in high-energy physics and are not suited for or adaptable to the field of medical scanning, e.g. the CERN detectors are exposed to ultra-high energy particles of many billions of electron volts for purposes of generating showers of high energy particles. The CERN detectors exhibit relatively thick electrodes which do not necessitate great precision in their spatial relationships. However, the box design of the detectors used at CERN have proven effective for maintaining TMP at what researchers believe is a few parts-per-billion clean level after months of use.

Thus, a need exists for a scanning liquid ionization chamber which can house and maintain a liquid ionization medium which has less than 100 molecules of impurities per billion molecules of ionization medium, resulting in reduced signal extraction time and improved signal-to-noise ratio. (Although an ionization medium having fewer than 100 molecules of impurities per billion molecules of ionization medium is stated as being desired, what is meant by this is that an ionization medium is desired which has a purity level which allows electron lifetimes to exceed 100 microseconds. Without question a high correlation exists between the purity level of an ionization medium and the resultant electron lifetime. Although it is at present difficult to quantify the purity level of a liquid ionization medium to a part-per-billion accuracy, the physics inherent to the present invention indicate that fewer than 100 molecules of impurities can be present in one billion molecules of ionization medium if electron lifetimes are to exceed 100 microseconds.)

SUMMARY OF THE INVENTION

Accordingly, one object of this invention is to provide a novel scanning liquid ionization chamber (SLIC) which functions as a highly radiation resistant imager for real-time portal localization and verification imaging in external beam photon radiation therapy.

Another object of the invention is to provide a novel SLIC IMAGER/DOSIMETER which enables real-time beam dosimetry.

Yet another object is to provide a novel SLIC IMAGER/DOSIMETER which improves imaging detail and clarity.

Still another object of the invention is to provide a novel SLIC IMAGER/DOSIMETER which serves a dosimetric function in that the signals produced allow for the easy determination of the intensity of a radiation beam transmitted through the patient or the intensity of a direct beam.

These and other objects are achieved by providing a new and improved scanning liquid ionization chamber IMAGER/DOSIMETER which includes a highly leak-tight closed housing having a first plurality of substantially parallel wires arranged in a first plane. A second plurality of substantially parallel wires are arranged in a second plane. The second plane of substantially parallel wires is spaced a predetermined distance from the first plane of parallel wires. The second plurality of wires are arranged in a direction orthogonal to the direction in which the first plurality of wires are arranged. Means for stringing and immobilizing the first plurality and the second plurality of wires are connected to the closed housing and electrically insulate the first plurality of wires and the second plurality of wires from the closed housing. A liquid ionization medium having fewer than 100 molecules of impurities per billion molecules of ionization medium completely fills any open space in the closed housing.

The present invention includes means for applying a biasing voltage to the second plurality of wires. Output means are connected to the first plurality of wires for extracting a detection signal produced by a radiation beam entering the closed housing and producing electrons in the ionization medium, the biasing voltage providing an electric field which sweeps the electrons from the fluid, thereby creating a signal which propagates through the first plurality of wires and through the output means.

The present invention greatly improves localization imaging by presenting images to the attending physician or technologist seconds after the X-ray radiation (typically from 3 to 50 megavolts) is delivered. This is to be compared with the several minutes necessary for removing film and developing it. This considerable reduction in time results in:

a) errors in patient positioning becoming evident and thereby being quickly corrected; and
b) treatment beginning seconds after the localization imaging confirms that the set-up is correct thereby reducing the risk associated with patient movement between the localization imaging and the treatment.

In the case of verification imaging which occurs during the course of a treatment, the present invention will produce images approximately once a second during the treatment and/or give a composite image integrated over the whole treatment. With film, only a composite image is attainable. Thus, the present invention permits a patient to be monitored during the course of treatment which allows the treatment to be altered or discontinued should the imaging information indicate that the patient has moved or that some other undesirable circumstance has arisen.

By detecting the photons which emanate from the radiation beam passing through a patient, the present invention when operated in conjunction with other imaging hardware and software is able to create X-ray like images of a patient at a rate of about one per second.

The present invention utilizes a liquid ionization medium which has fewer than 100 molecules of impurities per billion molecules of ionization medium. The liquid ionization medium is able to maintain its purity level because the materials which come into contact with it have been chosen for their non-soluble properties in regard to the ionization medium and have been heat treated so as to bake-off any impurities. As a direct consequence of this cleanliness, the electrons released during radiation bursts have a lifetime which exceeds 100 microseconds. This extended electron lifetime allows for the easy extraction of the entire electron signal which when processed by present day computer technology results in near instantaneous imaging.

Electrons have a mobility more than 100,000 times that of positive and negative ions in room-temperature fluids such as TMP. This fact makes it relatively easy for the present invention to detect the total electron signal in a comparatively short time interval. This results in a larger signal being attained per radiation burst than in previously known SLIC imagers.

Furthermore, with its improved signal capability, the present invention can realize smaller element spacing, and thus more detailed images, at far less of a penalty in speed than anything in the field thus far. Thus, the present invention brings great improvement to the field of medical imaging in a practical and cost efficient manner.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5A is schematic perspective view demonstrating wires immobilized in the inner frame of the invention while

DESCRIPTION OF THE PREFERRED EMBODIMENTS

Figure 1:
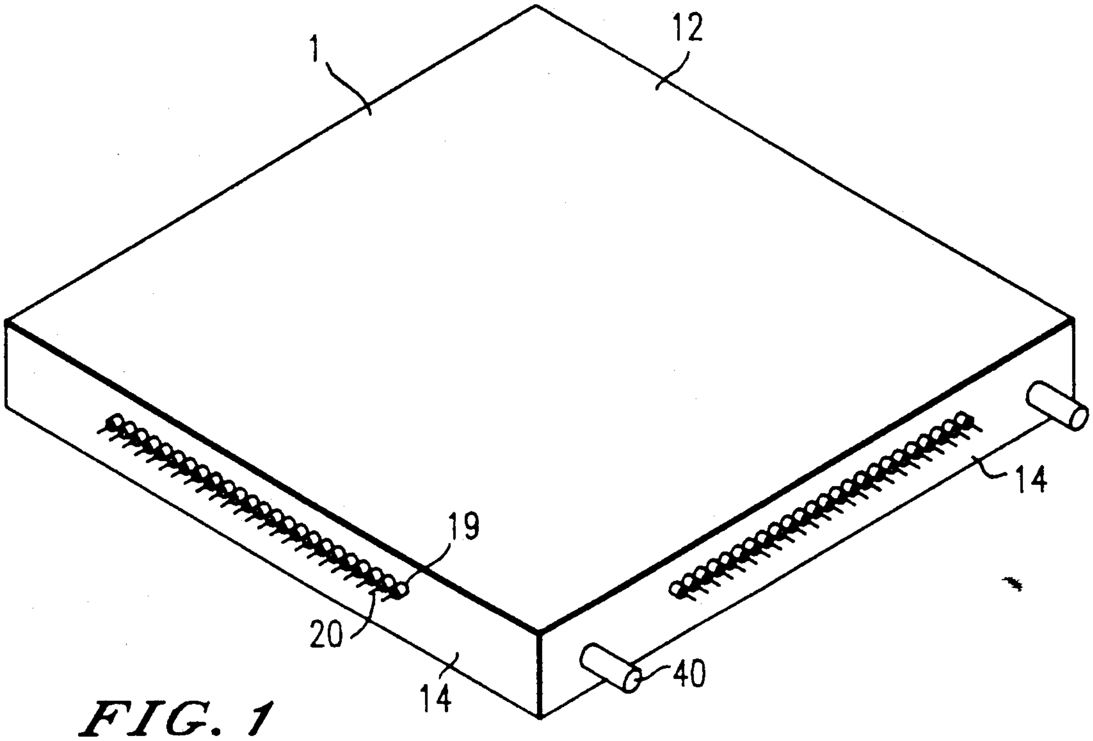
FIG. 1 is a schematic perspective view of the closed image detector device.

Referring now to the drawings, wherein like reference numerals designate identical or corresponding parts throughout the several views, and more particularly to FIG. 1 thereof, an imaging detector 1 is housed in a rectangular steel box 10 having exterior dimensions of approximately 10 inches × 10 inches × 1 inch. Rectangular box 10 is a single piece of stainless steel created by milling a solid rectangular slab, except for the top face 12 which is subsequently laser welded to the sides of the rectangular box to form a closed rectangular structure which comprises the imaging detector chamber. The sides of the box 14 have a wall thickness of 0.125" while the floor or bottom 16 of the box has a thickness of 0.095 inches. The top face 12 of box 10 is comprised of a thin sheet of stainless steel having a thickness of 0.006 inches, this top face serves as the window of the imaging detector. Each of the four adjacent sides 14 is provided with a line of twenty-five holes 18 into which ceramic feed-throughs 19 are placed and welded so as to create a seal. These feed throughs 19 are equipped with a fine stainless steel wire 20 which passes through their center.

Figure 2:
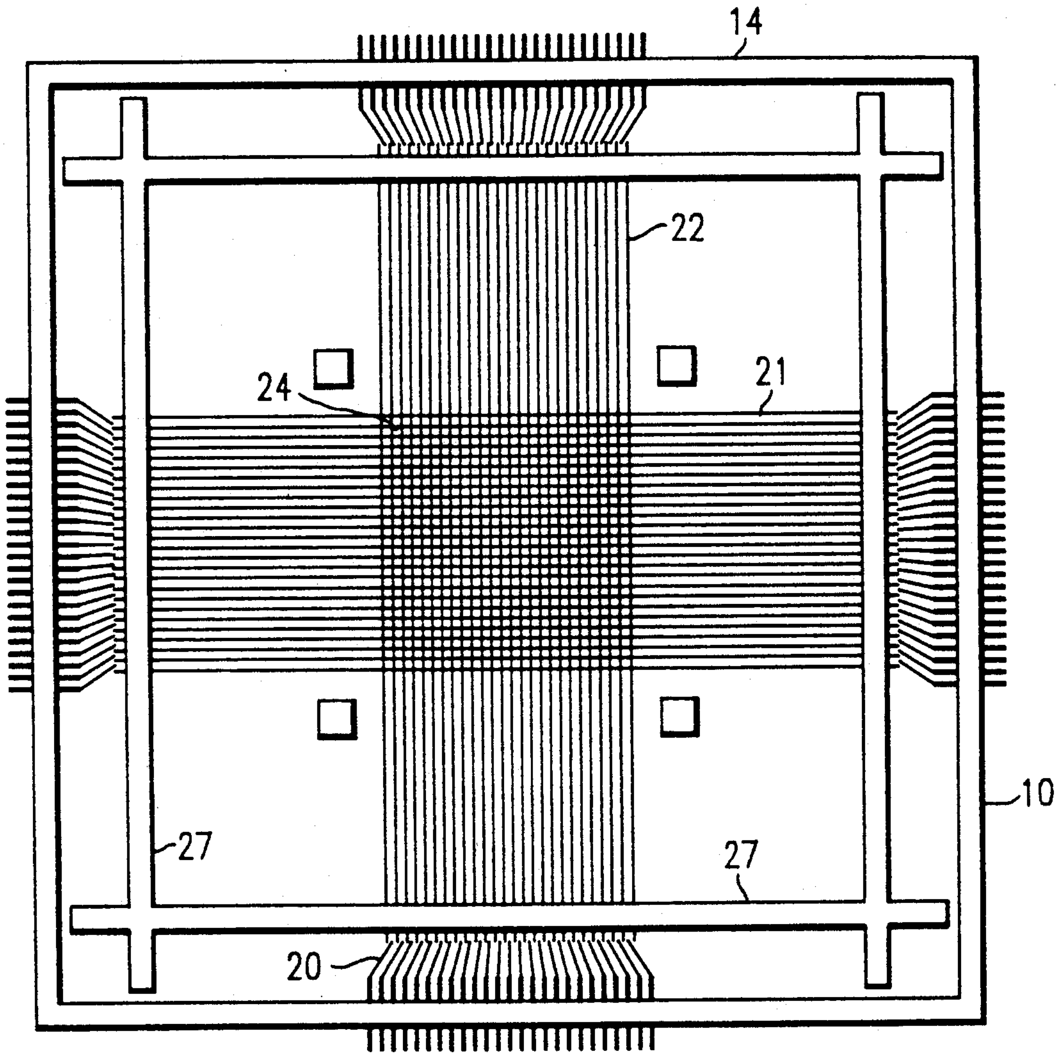
FIG. 2 is a top view of the imaging detector absent its top covering thereby exposing the crossed wiring which forms the imaging surface.

With reference to FIG. 2, two planes of wires are separately suspended or strung in the interior of the rectangular box so as to be suspended in open space and are separated by a plane-to-plane distance of 1 mm. It is realized that the invention may be utilized, however, with the planes being separated by other distances. It is also realized that the planes of wires could possibly be arranged in a circuit board construction if the materials constituting the circuit board were such that contamination of the ionization medium would not occur; the inventor has recognized that prior art SLIC's which utilize circuit boards are not capable of achieving electron life times which make quicker and clearer imaging possible.

Figure 4:
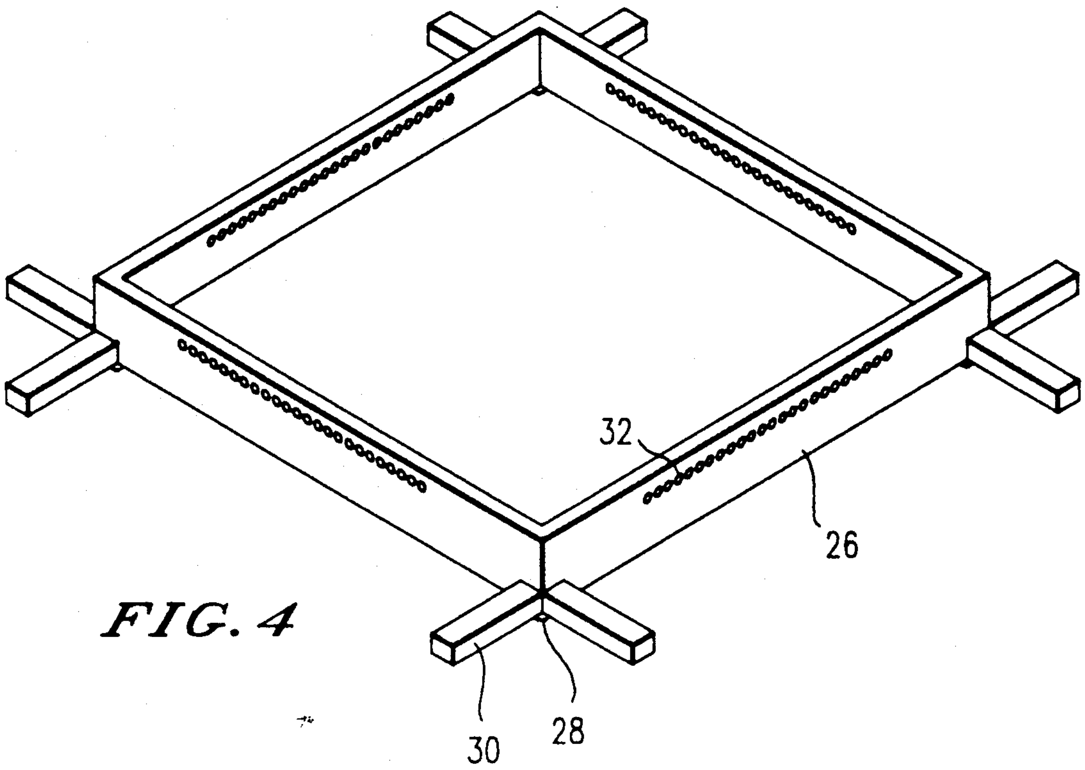
FIG. 4 is a perspective view of the internal frame of the present invention.

The wires in the first plane 21 are perpendicular to those in the second plane 22. These parallel planes of wires are supported by means of an internal frame 26 which is made of stainless steel. The internal frame has the shape of a square with an open center, the frame is equipped with bottom feet 28 (FIG. 4) and side fingers 30 which support the frame away from the sides and floor of the rectangular box when it is placed therein.

Figure 5A:
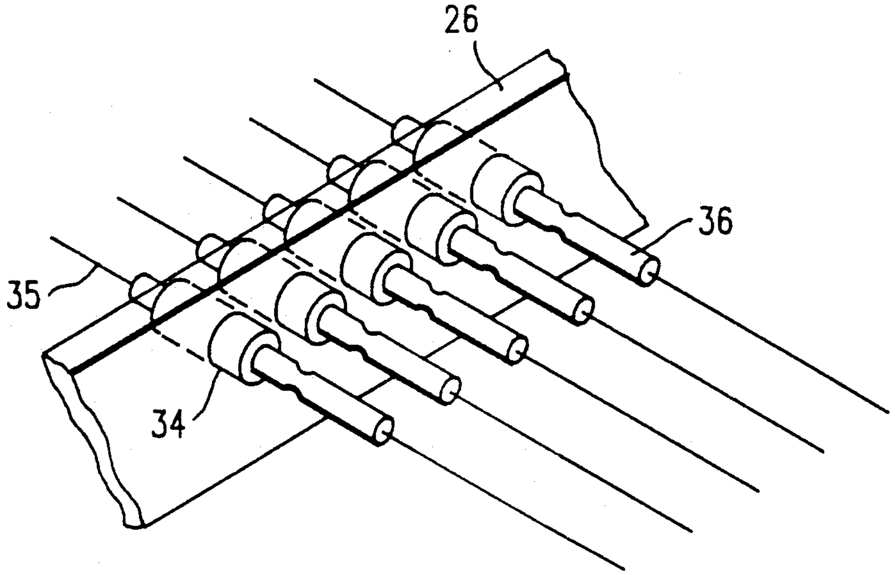
Figure 5B:
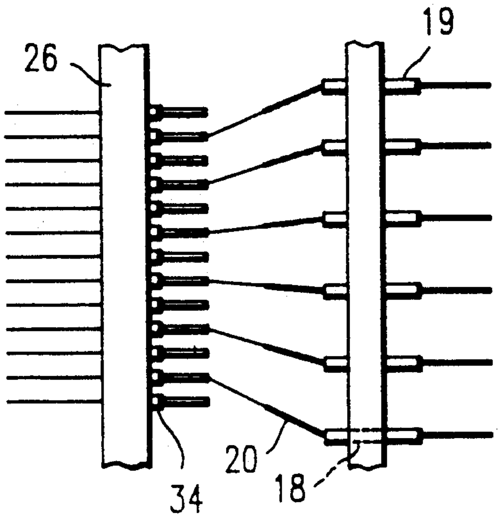
FIG. 5B is a top view illustrating interfacing of the wiring from the inner frame with the feedthrough mechanisms of the rectangular box.

Each of the four sides 27 of the internal frame has a line of fifty frame holes 32, centered in the middle of the frame. By means of ceramic tubing 34 and stainless steel tubing 36 wires 35 (FIG. 5*a*) are immobilized by crimping the stainless steel tubes 36 and are electrically insulated from frame 26 by the ceramic tubes surrounding the steel tubes. The frame holes 32 have a different diameter on the front of each side 27 than on the back of each side so as to prevent movement in the ceramic and stainless steel tubing thus immobilizing the wires. When fully strung, there are two orthogonal planes of 50 wires, with a wire-to-wire separation of 1.2 mm and a gap of 1 mm between the two planes. The overlapping region of the two wire planes constitutes the imaging surface 24 which, in the first prototype had a 6.0 cm×6.0 cm area, however other dimensions are of course possible.

When the wire planes are completely strung, the internal frame 26 is placed in the rectangular box 10 and welded to it at the fingers 30. In the present invention one plane of wires serves a biasing function and the other plane a sensing function and it does not matter which plane of wires is above the other. However, imagers using the concept of the invention can be used which have more than two planes of wires in which case the positioning of the planes of wires becomes a bit more complicated.

Figure 3:
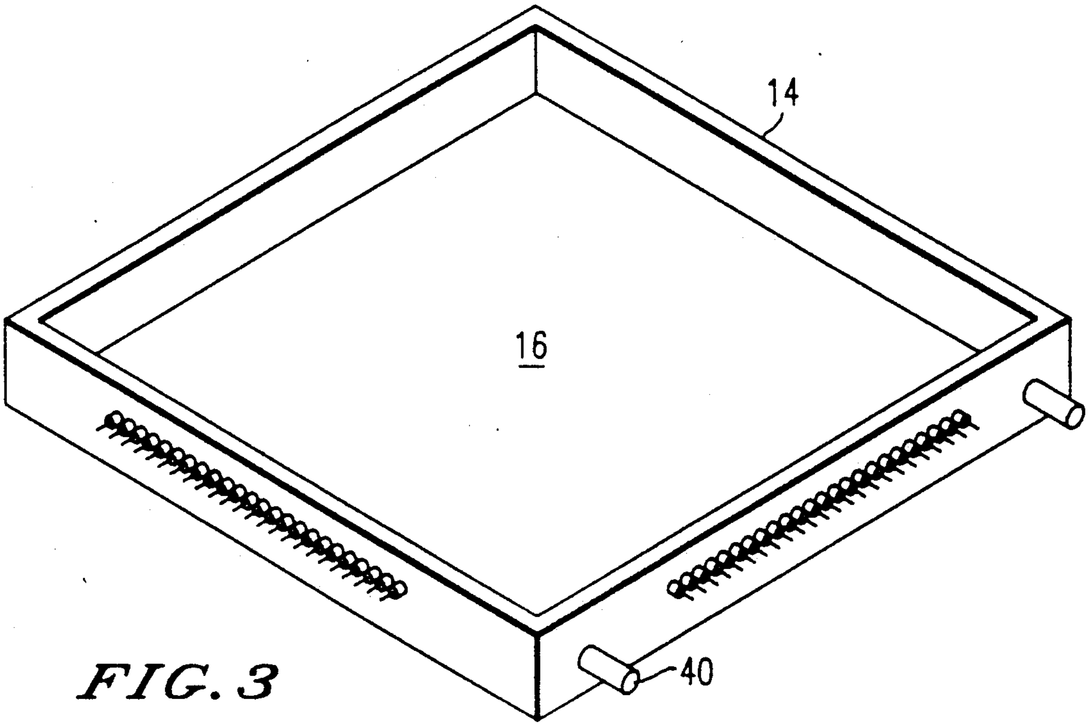
FIG. 3 is a schematic perspective view of the open rectangular box which houses the imaging chamber.

One end of each wire 35 passing through frame 26 is connected to the closest ceramic feed-through wire 20. By means of these feed-through wires which are accessible on the outside of the box, voltage can be applied to the voltage wires 21 and signals may be extracted from the sensor wires 22 while an electrically insulated leak-tight seal is maintained. These feed through wires 20 exit the box 10 at a side or sides 14 of box 10 as depicted in FIGS. 1-3; however it is understood that the invention can be designed so that the feed through wires 20 exit through ceramic feed throughs 19 located in the floor 16 of box 10. The chamber is closed by welding the top face of the box 12 over the top of the sides 14. With improvements in wire support and insulation means, a scanning liquid ionization chamber can be envisioned which does not need an internal frame.

The individual parts of the imaging detector chamber and the entire assembled imaging detector are subjected to various cleaning procedures in order to prepare it for the reception of pure 2,2,4,4-tetramethylpentane (TMP). (The 2,2,4,4-tetramethylpentane presently used in the invention is made by Wiley Chemical.) It is essential that the TMP or any other ionization medium be kept exceedingly pure, i.e., for every one billion molecules of TMP, fewer than 100 molecules of impurities are present. In the first prototype of the invention all materials in contact with the TMP in the interior of the chamber were either stainless steel or ceramic. However, it is understood that other materials can be used. Of importance is the fact that all materials in contact with the TMP must be capable of withstanding a high temperature bakeout in a vacuum without being altered. This bakeout which is usually conducted at 900° C. for many hours serves the purpose of driving off most surface impurities that would otherwise contaminate the TMP later on. Hence, it is necessary that the materials used be of a type that are capable of being cleaned in this manner, e.g. stainless steel, ceramic, kovar, and nickel have been used and there may be a limited number of other suitable materials (glass might possibly be used to replace ceramic).

If materials are used which are not capable of withstanding the high-temperature bakeout, their effect upon the purity of the TMP is proportional to the amount of their surface area. For example, the wires used in the interior of the detector consist of stainless steel and are well adapted for use in the detector. However, recrystallization of the chromium in the stainless steel at temperatures significantly above 300° C. result in the wire softening, and such softened wire cannot be used as it will not remain under tension after being strung. Thus, the wire is annealed to only 300° C. Fortunately, the surface area of the wires (the wire being approximately 6 thousandths of an inch in diameter) compared to the rest of the interior of the detector is so small that the amount of contamination that this presents is negligible. One can imagine working with wires made of materials other than stainless steel; however, such a material will have to be easily spot welded and ideally would have a thermal expansion rate similar to that of the stainless steel frame during the final 300° C. bakeout.

Also of importance is that the walls of the rectangular box 10 be sealed so as to prevent contaminants (air, etc.) from leaking into the detector. The technique used to keep the required degree of leak-tightness is to laser-weld all joints to high degrees of precision. As has been mentioned, stainless steel is the preferred material for the rectangular box. However, only low carbon content stainless steel (304 or 304L grade, for example) is satisfactory as higher carbon-content stainless steels are much less leak-tight after laser welding than low carbon content ones (partly due to the higher degree of corrosion in higher carbon content steel that occurs as a result of laser-welding). Kovar is also acceptable, in small quantities, and is metallized to the ceramic feed-throughs and then laser-welded to the box in order to seal the feed-throughs. The assembly of the SLIC is of course done in an appropriate clean room so as to avoid any contamination.

After the TMP is introduced by means of valves 40 which are welded into the corners of the box, the valves are shut. In this manner, the interior of the rectangular box constitutes a highly leak-proof environment which preserves the purity of the TMP. One plane of wires serves as the sense wires 22 from which the signals are extracted. The other plane of wires are voltage wires 21 to which a voltage bias is applied, one wire at a time. When one wire is activated by applying a bias, the points of intersection between the activated wire and all the sense wires constitute ionization cells.

For every radiation burst, the fraction of the high energy photon radiation treatment beam 46 passing through the patient encounters the imaging detector. A fraction of these photons interact with the detector or the photon converter 42 placed over the 0.006 inch window top 12 and produce high energy electrons. These high energy electrons create electron-ion pairs along their ionization track. The electrons and ions so formed when a high energy electron passes through an activated ionization cell and ionizes the TMP within are free to drift under the action of the applied electric field created by the bias applied to the corresponding voltage wire. (The device is presently operated with a voltage-bias of 50 volts.)

Since the ionization electrons move through the fluid under the action of the applied bias very quickly and since they have a life time of more than 100 microseconds as a result of the ultra-clean TMP, more than enough time is available to extract and process the signal constituted by these electrons. Thus all ionization electrons in these regions are swept away by the electric field created by the applied bias. The bias to a given voltage wire is applied for as many beam bursts as necessary in order to collect the desired amount of signal. Then, the voltage wire is brought to a zero bias and an adjacent voltage wire has a bias applied to it. The signal is extracted, burst-by-burst, from the rectangular box by means of wires 20 connected to the sensing plane of wires 22. In this fashion, the chamber is electronically scanned. The inventor recognizes that alternate scanning strategies exist which offer certain advantages in the operation of the device.

Figure 6:
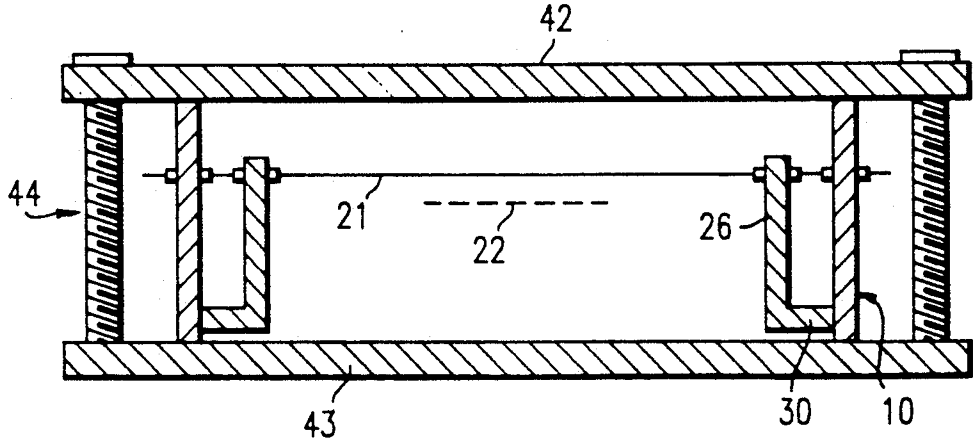
FIG. 6 is a cut away interior side view of the present invention.

The photon converter 42 is made of a high atomic number material chosen to maximize the number of photon interactions, particularly those from low energy photons which contain the best imaging information. The signals generated in the ionization cells pass out of the detector via the ceramic feed-throughs and onto other electronics. FIG. 6 shows the photon converter 42 placed over the top surface 12 of rectangular box 10. Rectangular box 10 is sandwiched between photon converter 42 and bulk plate 43 and secured thereto by clamps 44.

Figure 7:
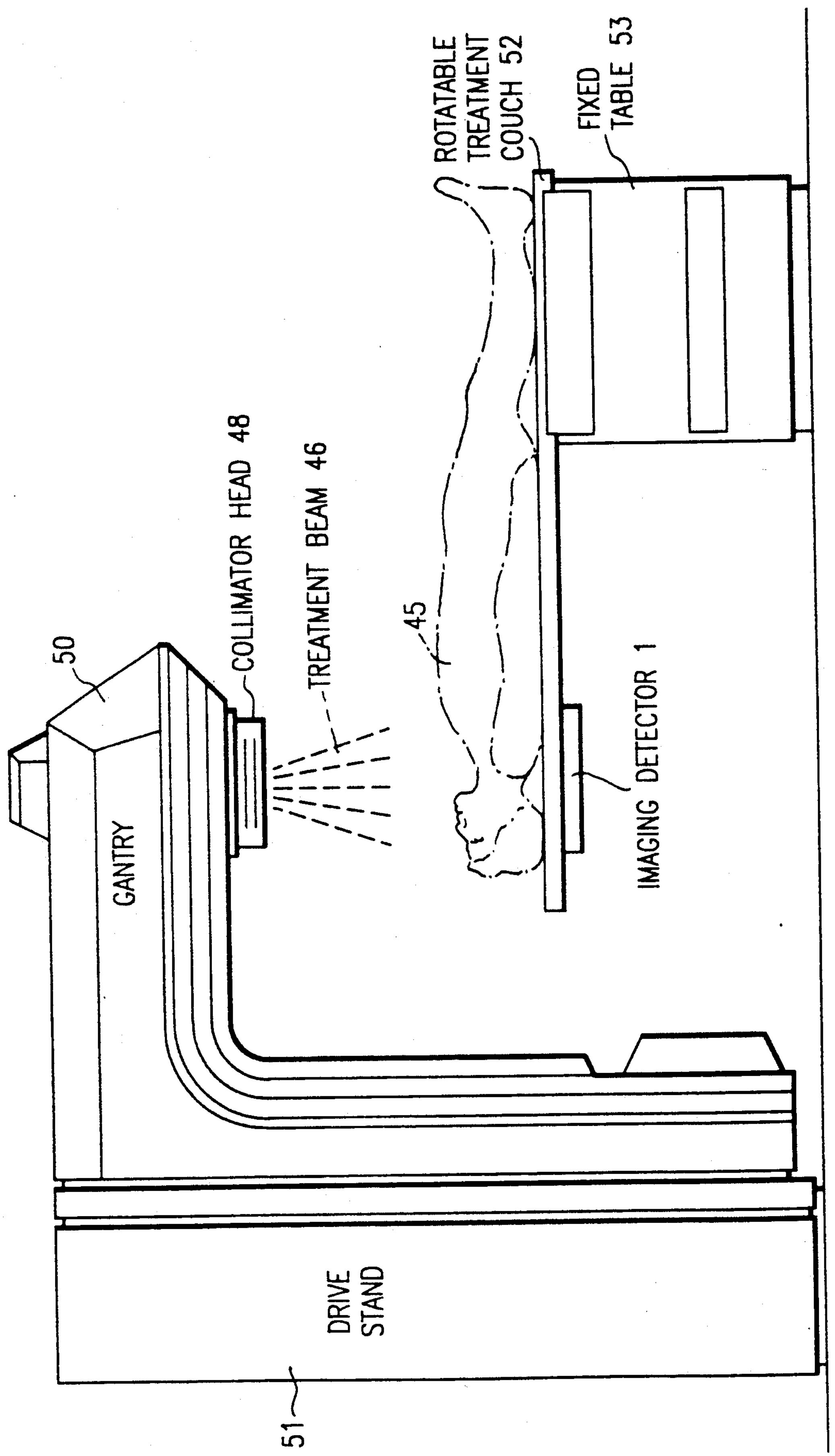
FIG. 7 is a general illustration showing how the present invention is utilized in a clinical setting.

FIG. 7 shows how the invention might be applied to a clinical setting. Depicted is a patient 45 receiving radiation from a treatment beam 46 emanating from a collimator head 48 which is attached to a gantry 50 and drive stand 51. As can be seen in the drawing, the patient while lying on treatment couch 52 supported by table 53 receives radiation from treatment beam 46 some of which passes through the patient 45 and on to imaging detector chamber 1.

Figure 8:
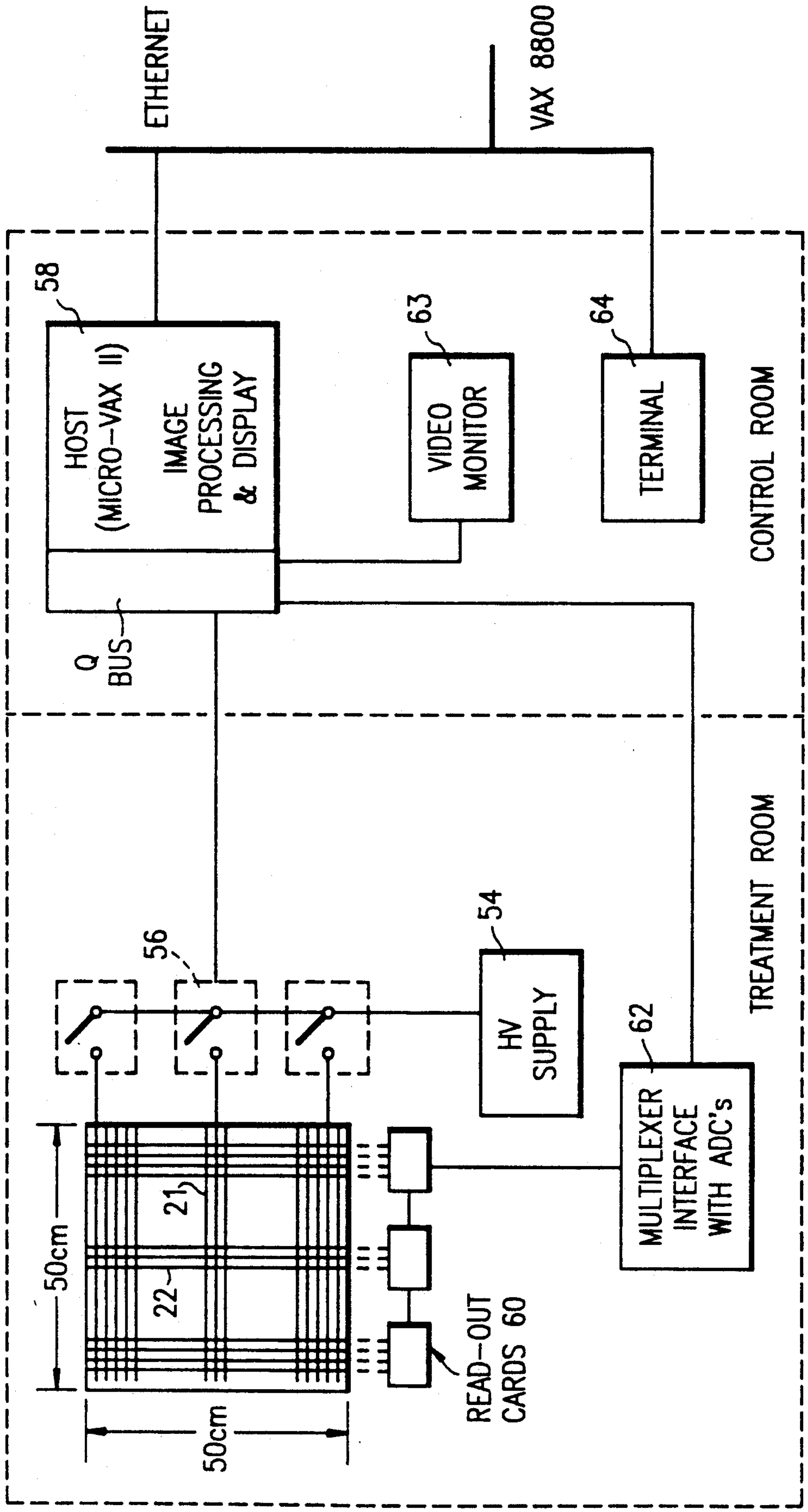
FIG. 8 is a schematic block diagram illustrating interfacing of the SLIC IMAGER/DOSIMETER of the present invention with supportive electronics.

FIG. 8 shows how the voltage wires 21 are connected to a voltage supply 54 which is equipped with switches 56. Voltage supply 54 is connected to microprocessor 58. In order to have a minimum of wires running from the detector to the remote electronics, the analog signals coming from sensor wires 22 are multiplexed by read-out cards 60 and sent to a analog/digital converter 62 whereby the digitized signals are passed to microprocessor 58. As can be seen, microprocessor 58 is connected to video monitor 63 and to terminal 64.

In this fashion, a charge for every ionization cell in an activated row is read out, digitized, and forwarded. The read-out is rapid enough to keep up with the fastest common-used pulse repetition rates of 400 Hz. By means of present day micro computer technology the image enhancement of the present invention can be completed in approximately 1 second after a full set of raw imaging information is presented. The resulting image will then be displayed promptly on the monitor 63 next to the control terminal 64 of the treatment machine. The image can be superimposed with any desired information from the treatment planning system.

On a burst-by-burst basis and for comparable electrode geometries, the present invention obtains at least 60 times more ionization signal than any prior art SLIC imaging device. Moreover, the present invention requires a smaller signal collection time when compared to prior art SLIC devices, resulting in a superior signal to noise ratio.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A scanning liquid ionization chamber for use with a radiation beam, comprising:

a closed housing;

a first plurality of substantially parallel wires arranged in a first plane;

a second plurality of substantially parallel wires arranged in a second plane, wherein the second plane of said second plurality of substantially parallel wires is spaced a predetermined distance from the first plane of said first plurality of substantially parallel wires, and said second plurality of wires are arranged in a direction orthogonal to the direction in which said first plurality of wires are arranged;

means for stringing and immobilizing said first plurality and said second plurality of wires, said means for stringing and immobilizing being connected to said closed housing and electrically insulating said first plurality of wires and said second plurality of wires from said closed housing;

a liquid ionization medium having a predetermined purity located inside said closed housing;

biasing means for applying a biasing voltage to at least one wire of said second plurality of wires, said radiation beam producing electrons in said ionization medium, and said biasing means in combination with said radiation beam producing a detection signal based at least in part on said electrons along at least one wire of said first plurality of wires; and output means connected to said first plurality of wires for extracting said detection signal.

2. A chamber according to claim 1, wherein:

said ionization medium contains fewer than 100 molecules of impurities per billion molecules of tetramethylpentane.

3. A chamber according to claim 1, wherein said stringing and immobilizing means comprises:

a rectangular internal frame mounted in said closed housing; and a plurality of connectors mounted on the sides of said internal frame, said first plurality and second plurality of wires being strung across said internal frame by means of said plurality of connectors.

4. A chamber according to claim 3, wherein said internal frame comprises:

a plurality of frame holes; and wherein said plurality of connectors comprise nonconductive connectors inserted through said frame holes.

5. A chamber according to claim 4, wherein said closed housing comprises:

a plurality of housing feed-through holes; and wherein nonconductive wire feed-through means seal said plurality of housing feed-through holes.

6. A scanning liquid ionization chamber according to claim 3, wherein:

said internal frame is made of stainless steel.

7. A chamber according to claim 1, wherein:

said ionization medium is 2,2,4,4 tetramethylpentane.

8. A chamber according to claim 1, wherein:

said housing is made of stainless steel.

9. A chamber according to claim 1, wherein:

said ionization medium completely fills any open space inside said housing.

10. A scanning liquid ionization chamber for use with a radiation beam, comprising:

a closed housing;

an internal frame mounted inside said housing;

a first side of said internal frame having a predetermined plurality of holes in planar alignment with a predetermined plurality of holes located on a side of said internal frame opposite to said first side;

a second side of said internal frame having a predetermined plurality of holes in planar alignment with a predetermined plurality of holes located on a side of said internal frame opposite to said second side;

a first plurality of wires extending through said holes in said first side and said holes opposite to said first side;

a second plurality of wires extending through said holes in said second side and said holes opposite to said second side, said first and second plurality of wires forming orthogonal planes separated by a predetermined distance;

means for stringing and immobilizing said first and second plurality of wires through said holes in said first side and said side opposite said first side and said holes in said second side and said side opposite said second side;

non-conductive wire feed through means for sealing a plurality of holes located on said housing;

a liquid ionization medium located inside said closed housing;

biasing means for applying a biasing voltage to at least one wire of said second plurality of wires, said radiation beam producing electrons in said ionization medium, and said biasing means in combination with said radiation beam producing a detection signal based at least in part on said electrons along at least one wire of said first plurality of wires; and output means connected to said first plurality of wires for extracting said detection signal.

11. A chamber according to claim 10, wherein:

said ionization medium is tetramethylpentane which contains fewer than 100 molecules of impurities per billion molecules of said tetramethylpentane and completely fills any open space inside said housing.

* * * * *